United States Patent
Gebhardt et al.

(10) Patent No.: US 10,799,326 B2
(45) Date of Patent: Oct. 13, 2020

(54) METHOD FOR THE POSITIONING OF A BLANK

(71) Applicant: DENTSPLY SIRONA Inc., York, PA (US)

(72) Inventors: Andreas Gebhardt, Langenselbold (DE); Stefan Fecher, Johannesberg (DE); Lothar Volkl, Goldbach (DE)

(73) Assignee: DENTSPLY SIRONA INC., York, PA (US)

( * ) Notice: Subject to any disclaimer, the term of this patent is extended or adjusted under 35 U.S.C. 154(b) by 145 days.

(21) Appl. No.: 15/671,779

(22) Filed: Aug. 8, 2017

(65) Prior Publication Data
US 2019/0046305 A1 Feb. 14, 2019

(51) Int. Cl.
*A61C 13/00* (2006.01)
*B23Q 3/18* (2006.01)
*A61C 13/08* (2006.01)

(52) U.S. Cl.
CPC ............ *A61C 13/0022* (2013.01); *B23Q 3/18* (2013.01); *A61C 13/0004* (2013.01); *A61C 13/0006* (2013.01); *A61C 13/08* (2013.01)

(58) Field of Classification Search
CPC .. B23Q 3/00; B23Q 3/06; B23Q 3/066; A61C 13/0004
See application file for complete search history.

(56) References Cited

U.S. PATENT DOCUMENTS

| | | | | | |
|---|---|---|---|---|---|
| 4,517,043 | A | * | 5/1985 | Martin | A61C 11/087 156/196 |
| 4,610,020 | A | * | 9/1986 | La Fiandra | B23Q 3/08 250/491.1 |
| 4,615,678 | A | | 10/1986 | Moermann | |
| 5,165,160 | A | * | 11/1992 | Poncelet | B23K 37/0533 228/49.3 |
| 8,266,776 | B2 | * | 9/2012 | Dwileski, Jr. | B23K 37/0533 228/212 |
| 8,393,605 | B2 | * | 3/2013 | Yang | B25B 5/003 269/287 |
| 8,402,624 | B2 | | 3/2013 | Galehr | |
| 2003/0031977 | A1 | * | 2/2003 | Bodenmiller | A61C 13/0003 433/49 |
| 2018/0257187 | A1 | * | 9/2018 | Grobbee | B23Q 3/062 |

(Continued)

FOREIGN PATENT DOCUMENTS

| | | |
|---|---|---|
| DE | 20316004 U1 | 3/2004 |
| DE | 202012008015 U1 | 1/2013 |

(Continued)

OTHER PUBLICATIONS

International Search Report; PCT/EP2017/070003; dated Apr. 13, 2018 (completed); Apr. 25, 2018 (mailed).

(Continued)

*Primary Examiner* — Lee D Wilson
(74) *Attorney, Agent, or Firm* — Dentsply Sirona Inc.

(57) ABSTRACT

The invention relates to a method for positioning a blank (116), which after insertion in a holder is in contact therewith, wherein the holder has a structural element. The blank (16) is positioned in the holder by way of an adapter (118), which is inserted in both the holder or the structural element and the blank, wherein the adapter positively engages with the holder or the structural element and with the blank.

17 Claims, 10 Drawing Sheets

(56) References Cited

U.S. PATENT DOCUMENTS

2018/0323518 A1\* 11/2018 Smith ..................... H01R 4/60
2019/0046305 A1\* 2/2019 Gebhardt ........... A61C 13/0022

FOREIGN PATENT DOCUMENTS

| EP | 3095412 A2 | 9/2018 |
|----|------------|--------|
| WO | 0217815 A1 | 3/2002 |
| WO | 2016153986 A1 | 9/2016 |

OTHER PUBLICATIONS

Written Opinion of the International Searching Authority; PCT/EP2017/070003; dated Apr. 13, 2018 (completed); Apr. 25, 2018 (mailed).

International Preliminary Report on Patentability (IPRP); PCT/EP2017/070003; dated Apr. 13, 2018 (completed); Apr. 25, 2018 (mailed).

\* cited by examiner

METHOD FOR THE POSITIONING OF A BLANK

TECHNICAL FIELD

The invention relates to a method for positioning a blank, in particular a disc-shaped one, which, after being inserted into a holder, is in contact therewith, wherein the holder or an element connected to it in a fixed position has a structural element, such as a receptacle, a recess or a projection.

BACKGROUND OF THE INVENTION

Ceramic materials are widely used for the production of dental reconstructions. In this process, blanks are generally machined from the material in a pre-sintered or densely sintered state. For this purpose, it is necessary for the blanks to be fixed in a holder, e.g., through clamping, which in turn is arranged in a processing machine such as a milling machine.

In order to fix the blank in a processing machine, an adapter is provided according to WO02/17815 A1, which is connected on the one hand to the blank and via which, on the other hand, fixing in the processing machine takes place.

Corresponding assemblies are given in EP 0 160 797 B1 and EP 2 036 516 B1.

DE 203 16 004 U1 discloses a metallic blank for the production of a dental prosthesis. The blank has a circumferential groove as well as a notch extending perpendicularly thereto, so that a reproducible clamping can take place in a digitally-controlled dental milling system.

In the production of certain tooth replacement parts, in particular of full prostheses or of implant abutments or parts thereof, it is necessary for the blank to be removed from the holder between individual processing steps. This brings the risk that, during repositioning, i.e., re-insertion into the holder, the blank is not in the same position as in the preceding machining step, so that defective tooth replacement parts are produced.

The object of the present invention is to further develop a method of the aforementioned type in such a way that, without changes to the holder or an element in fixed-position connection therewith, it is insured that the blank is always in the desired position in the holder and thus relative to the processing machine, so that machining errors resulting from incorrect positioning of the blank are avoided.

SUMMARY OF THE INVENTION

To achieve this aim, the invention essentially provides for the blank to be positioned in the holder by means of an adapter, which is inserted into the holder or the structural element as well as into the blank, the adapter being positively engaged both in the holder or the structural element and in the blank.

In particular, the invention relates to a method for producing a prosthesis, in particular a full denture or an implant abutment, comprising at least the method steps Positioning of a blank, in particular a disc-shaped one, in a holder,
Working of the blank in a processing machine,
Removal of the blank from the holder and performing at least one working step outside of the processing machine,
Repositioning of the blank in the holder,
Resume processing of the blank in the processing machine.

Examples of processing steps include the securing of artificial teeth in the machined blank, in the case of the production of a full prosthesis, or the production of parts of an abutment.

In accordance with the invention, an unambiguous positioning of the blank in the holder is facilitated by a separately produced adapter. In this case, the adapter is inserted into a structure which is present in the holder or in an element that is connected thereto in a fixed position, such as a receptacle like a depression, on the one hand, and in a receptacle adapted to a section of the adapter in the blank to insure a fixed-position relationship between the holder and the blank. The receptacle can also be designed as a projection which is surrounded by the adapter at least in sections.

Corresponding structures which are suitable for accommodating or fixing a section of the adapter are present in the holders that are available on the market. Such structures may also be formed as bores into which, a screw element is inserted e.g. for fixing an element which closes a holder, such as a cover. To position the blank, the screw is removed and a correspondingly adapted section of the adapter is positively inserted into the bore. A further section of the adapter then engages in the previously formed mechanical referencing, such as a groove, depression or the like, of the blank.

According to the invention, a separate adapter is used to enable an unambiguous positioning of the blank. There is no need for a holder comprising an integrated structural section, such as a projection, to bring about the desired positioning of the blank in the holder; as an unambiguous positioning is in principle only necessary if a repositioning is required. In contrast, if the holder were to have a projection serving as a positioning aid, then only blanks which have a correspondingly adapted section could be used. According to the teaching of the invention, however, only those blanks that are to be repositioned need to be provided with a mechanical referencing.

The adapter, which can also be referred to as an auxiliary part, can be produced from thermoplastic material such as PMMA, in particular in the processing machine in which the blank itself is machined. For this purpose it is only necessary that the geometries of the structure, such as the receptacle in the blank holder and the referencing to be produced, are available, e.g., in the form of STL files. Naturally, it is also possible to use prefabricated adapters from other materials, e.g., metallic ones.

The receptacle for the adapter in the holder respectively the element requires no connection to the contact surface of the blank in the holder. Rather, the adapter may, for example, have a shape for enveloping or bridging regions of the holder, and sections engaging positively in the holder or in the receptacle, that is the mechanical referencing of the blank.

The teaching according to the invention, i.e., the use of a separately produced adapter, which can be releasably inserted into the holder as well as into the blank and which can also be removed before machining of the blank, is suitable for all types of holders, therefore also for those that circumscribe the blank or envelop it only in part.

A method for the production of a prosthesis, in particular a full denture, comprising at least the following method steps Positioning of a blank, that in particular is disc-shaped, in a holder,
Processing of the blank in a processing machine,
Removal of the blank from the holder and working of the blank outside of the processing machine, Repositioning of the blank in the holder,
Re-working of the blank in the processing machine,
is characterized in that
both the positioning and repositioning of the blank in the holder is by means of an adapter, which interacts with the holder or with an element connected therewith in a fixed position, as well as with a mechanical referencing formed in the blank, which is adapted to a section of the adapter.

In particular, a blank is used, in which a section or the entire circumferential surface of the blank or an element connected to the blank is preferably circumferentially, or substantially circumferentially, contacted with the holder which rests against the circumferential surface or the section.

Further details, advantages and features of the invention are derived not only from the claims, and the features to be taken from them—either alone and/or in combination—but also from the examples described below and illustrated by drawings.

DETAILED DESCRIPTION OF THE INVENTION

Figure 1:
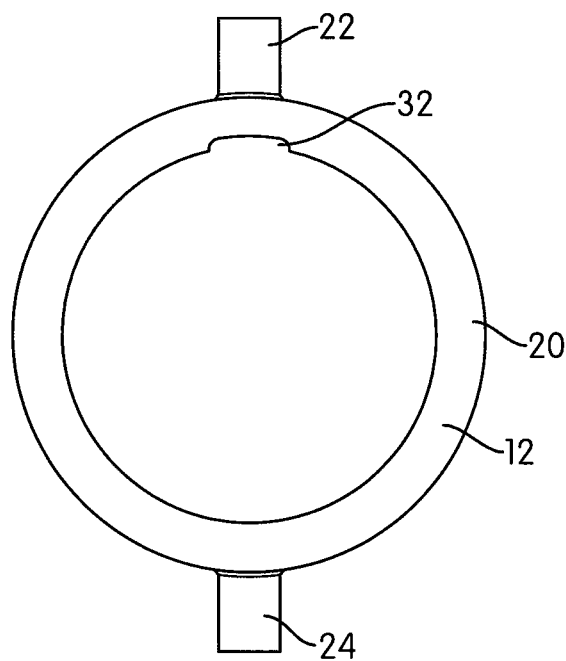
FIG. 1 is a top view of a lower part of a first embodiment of a holder to hold a blank.
Figure 2:
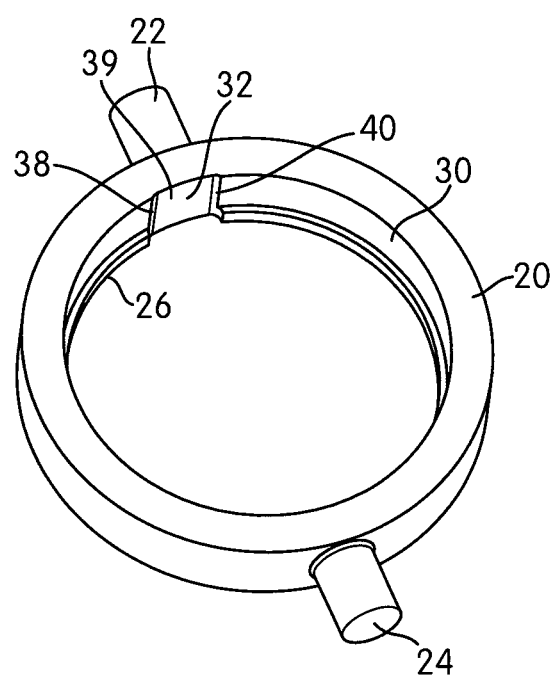
FIG. 2 is a perspective view of the lower part according to FIG. 1.

FIGS. 1 and 2 show a holder 10, comprising a pot-shaped lower part that is open on the bottom side and an upper part 14, or cover, which is connectable thereto, for instance through screws, in an annular manner, to accommodate a disc-shaped blank 16 and to fix it so that it can be processed in a processing machine such as a milling machine through a CAD/CAM process for the production of a dental part, in particular a full denture.

To make certain that the blank 16, which may be, for example, of plastic such as PMMA or a ceramic, such as zirconium dioxide, when it has to be removed from the processing machine and thus from the holder 10 between individual processing steps, in particular in connection with the production of a full denture or parts of abutments, upon re-inserting, i.e., repositioning, assumes exactly that position prior to removal, an adapter 18, also referred to as a positioning aid, is used according to the invention. The adapter 18 brings about a positive connection between the blank 16 and the holder 10, so that the desired exact positioning and repositioning is ensured.

The adapter 18, for instance made from PMMA, is designed in such a way that fixing in the holder 10 takes place by using an existing structural feature of the holder such as a recess or projection, so that changes to the holder itself are not required.

The holder 10 described in the example consists of the lower part 12 which has a circumferential wall 20 that follows a hollow cylinder section from which diametrically opposite shaft stumps 22, 24, referred to as axes, project, which are used for attachment in a processing machine—hereinafter simply referred to as a milling machine. On the bottom side, a substantially circumferential and inwardly-projecting web or flange 26 extends from the circumferential wall 20, onto which the blank 16 with a peripherally extending web or collar 28 is placed, which can be an integral component of the blank 16 itself or a separate element, which is connected to the blank 16, for instance through gluing.

In the example, a recess 32 extends over the height of the circumferential wall 20 in the inner wall 30 of the circumferential wall 20 and is suitable for the insertion of an insert, not shown, into the lower part 12 of the holder 10, which can serve for example to hold individual blanks, as is known, for example, from WO 2016/153986 A1.

In other words, the recess 32 in the lower part 12 is provided for structural reasons. According to the invention, this recess 32 or another suitable structural design of the lower part 12 is used to positively hold the adapter 18 or a section thereof so that it is clearly positioned. A further section of the adapter 18 engages in a mechanical referencing device 34 to be formed in the blank 16, which in the example is designed as a groove extending in the axial direction of the blank 16.

As the graphical representation of FIG. 7 shows, the adapter has an arcuate base section 36, which is adapted in the circumferential direction to the recess 32 and with respect to its boundaries 38, 40. The back surface 37 of the base portion 36 is adapted in its course to the base surface 39 of the recess 32. Thus, the adapter 18 can be positively inserted into the recess 32 without a displacement of the adapter 18 in the direction of the circumferential wall.

Thus, the distance between the side edges 42, 44 of the base part 36 corresponds to the distance between the edges 38, 40 of the recess 32.

A projection 46 protrudes from the inner surface of the base part 36, the groove 36 of which is matched to the geometry so that the distance between the side edges 48, 50 of the projection 46 is equal to the distance of the side edges 52, 54 of the groove 34.

Furthermore, flat-shaped sections 56, 58 in the form of an arc extend from the inner surface of the base section 36 and merge into the circumferential web or collar 28 on the upper side. However, the projections 56, 58 are not mandatory constructive features of the adapter 18.

Figure 5:
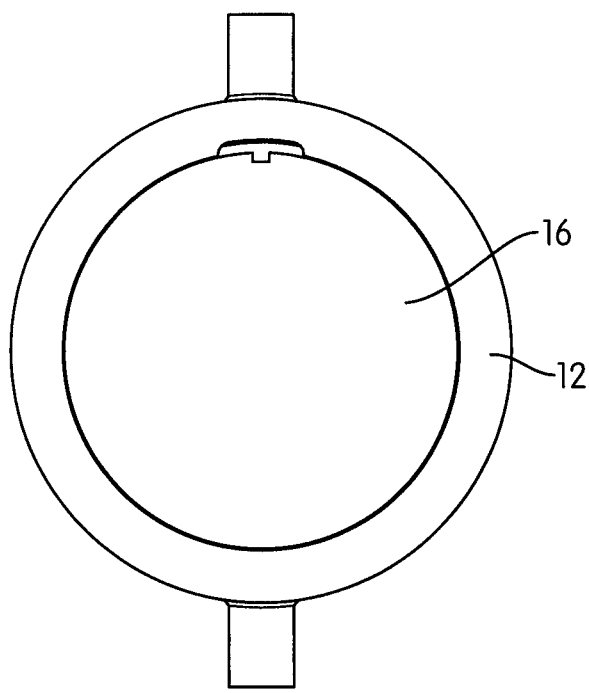
FIG. 5 is a top view of the lower part of the holder according to FIGS. 1 and 2 with the blank inserted.
Figure 6:
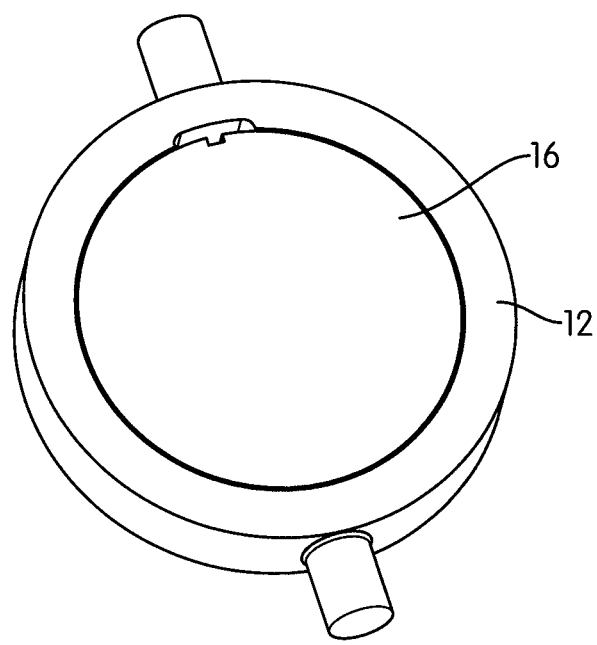
FIG. 6 is a perspective view of the lower part with blank according to FIG. 5.
Figure 7A:
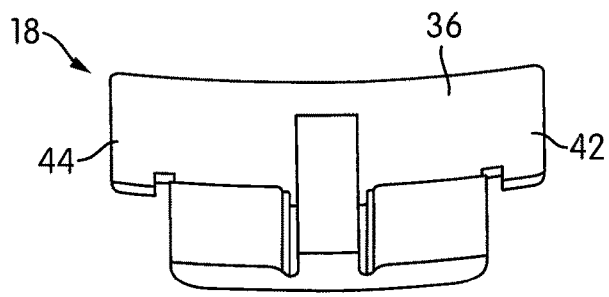
FIG. 7A is a perspective front view of a first embodiment of an adapter.
Figure 7B:
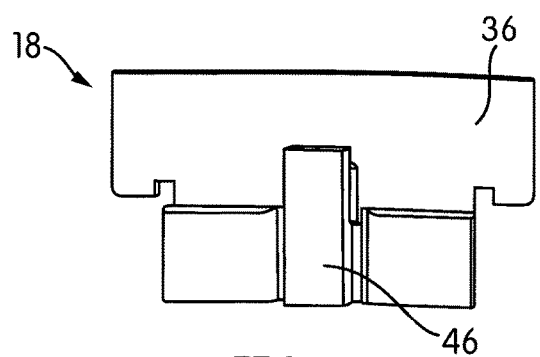
FIG. 7B is another perspective front view of the adapter shown in FIG. 7A.
Figure 7C:
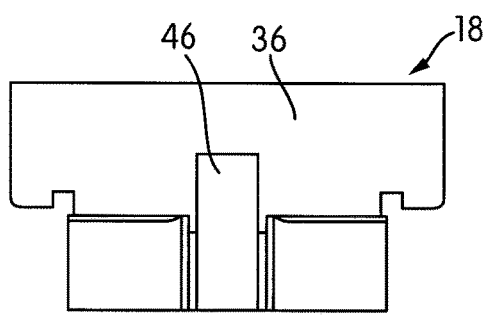
FIG. 7C is a front view of the adapter shown in FIG. 7A.
Figure 7D:
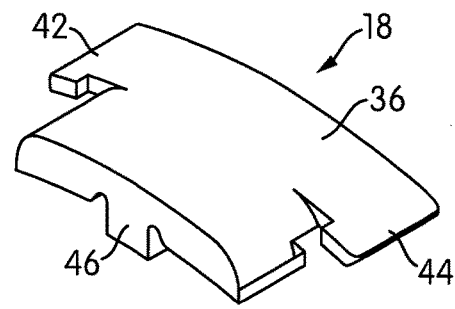
FIG. 7D is a perspective rear view of the adapter shown in FIG. 7A.
Figure 7E:
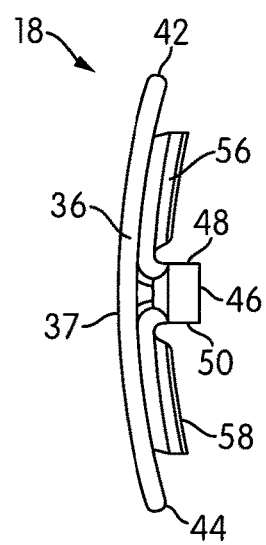
FIG. 7E is a bottom view of the adapter shown in FIG. 7A.

In FIGS. 5 and 6, the blank 16 is inserted into the lower part 12 of the holder 10 without a positive connection being effected via the adapter 18. It can be seen from the drawing that the blank 16 can be inserted in virtually any desired position. Thus, it is not possible to ensure a predetermined, defined alignment between the blank 16 and the holder 10 or the lower part 12.

Figure 8:
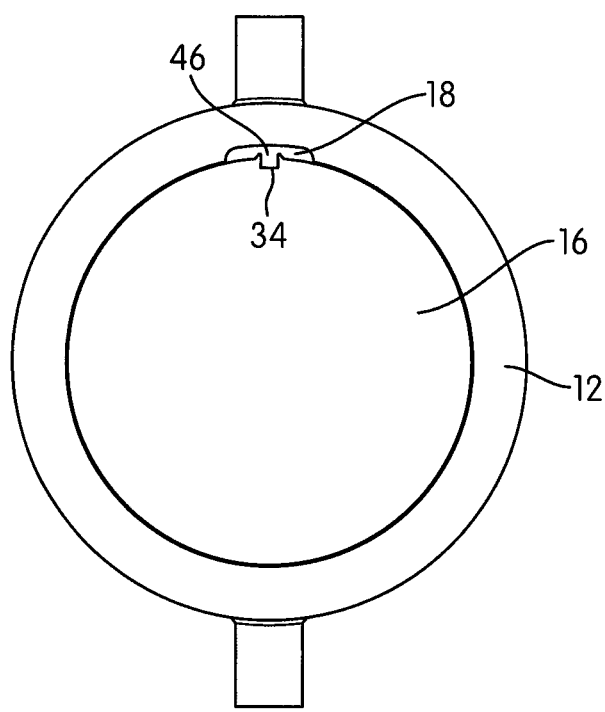
FIG. 8 is the lower part of the holder according to FIGS. 1 and 2 in which the blank according to FIGS. 2 and 3 is positioned by means of the adapter according to FIGS. 7A-7E.
Figure 9:
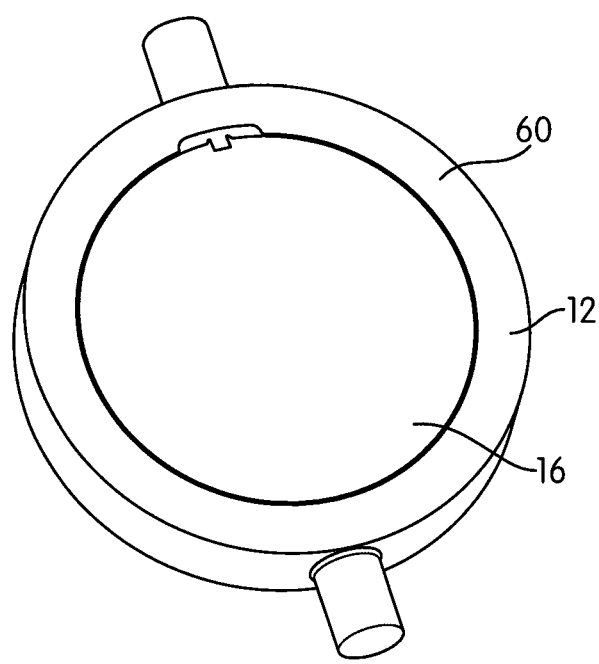
FIG. 9 is a perspective view of the arrangement according to FIG. 8.
Figure 10:
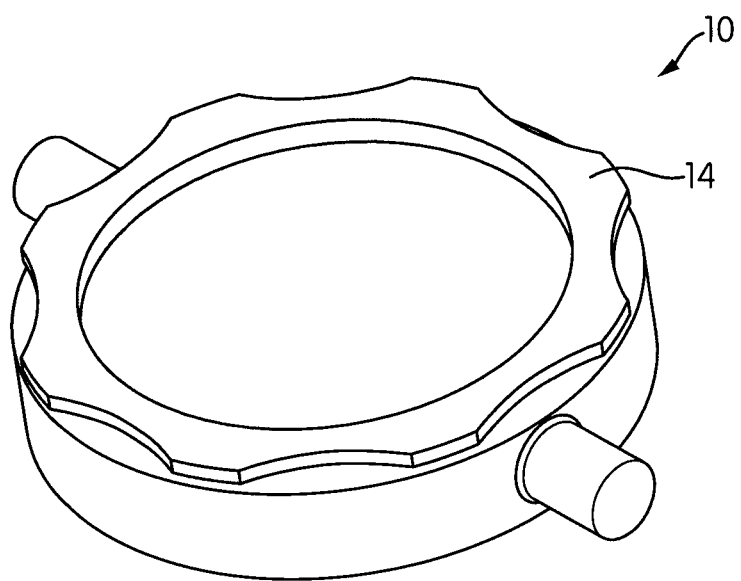
FIG. 10 is a holder with the lower part shown in FIGS. 1 and 2 and the locking part connected thereto.

If the adapter 18 is used as shown in the drawings of FIGS. 8 and 9, then the blank 16 can only be inserted into the lower part 12 in the position in which the groove 34 is aligned with the projection 46 and can penetrate into the groove 34. Thus, the blank 16 can be inserted into the holder 10 in a clear position and thus into the lower part 12. After removal and subsequent repositioning, no other position can be assumed between the blank 16 and the lower part 12 of the holder 10 than that specified by the adapter 18. After correct positioning of the blank 16 in the lower part 12, this is closed by means of the annular upper part 14 designated as the cover. In particular, the upper part 14 is screwed into the lower part 12.

The adapter 18 in FIG. 7 is shown purely by way of example, without thereby limiting the invention. There is also the possibility, for example if a recess is provided in the upper edge 60 of the upper part 12, to form an adapter which can be inserted into the corresponding recess and, on the other hand, into a mechanical referencing such as a bore or groove present in the blank 16. In this case, the adapter would have to bridge a section of the lower part 12, as will be explained with reference to FIGS. 11A to 13H.

Other structured regions which are present in a holder can also be used to enable a form-fitting reception of an adapter which, in accordance with the teaching of the invention, must in turn positively engage a mechanical referencing of a blank to achieve a positioning and repositioning of the blank in a desired manner in the corresponding holder, without the possibility of any deviation in the position of the blank relative to the holder after re-insertion.

A further embodiment of a holder 110 and an adapter 118 is shown in FIGS. 11A to 13H to enable a clear positioning and repositioning of a blank 116 in accordance with the teaching of the invention.

The holder 110 comprises a lower part 112 in which a recess (not shown in the drawing) corresponding to the size of the blank 116 is present in order to provide the possibility that the blank 116 can be machined from both sides in a milling machine.

Figure 3:
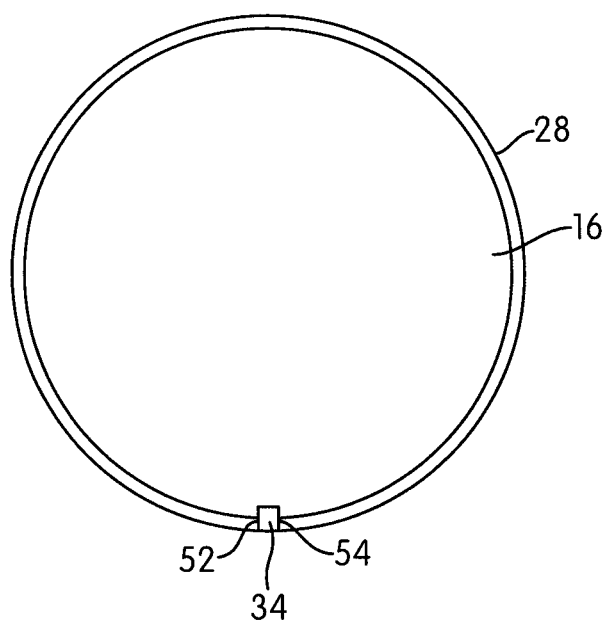
FIG. 3 is a top view of a blank.
Figure 4:
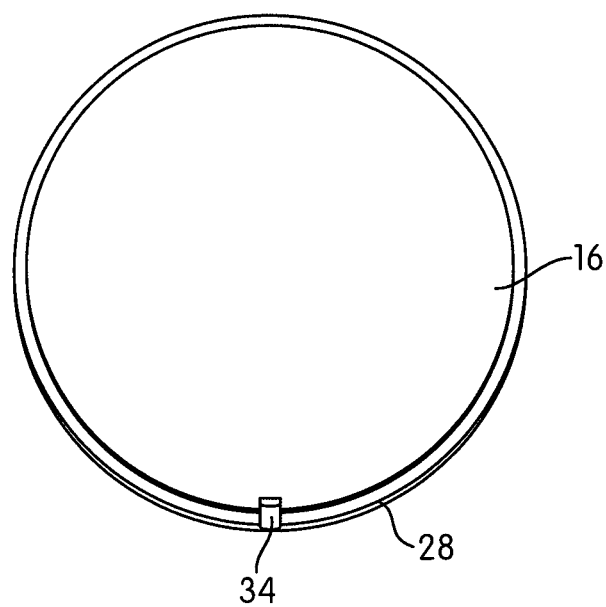
FIG. 4 is a perspective view of the blank according to FIG. 3.

The blank 116 is fixed in the holder 110 by means of a top part 114 designated as a clamping ring in the holder 110. In this case, the blank 116 rests with a circumferentially extending web or collar, as explained with reference to FIGS. 3 and 4, on a corresponding shoulder of the lower part 112.

The clamping ring 114 is fixed with the lower part 112 by means of screws, one of which is indicated by the reference number 115 by way of example only. In order to allow the clamping ring 114 to be easily connected to, or disconnected from, the lower part 112 without having to remove the screw 115, corresponding oblong-shaped holes 117 are provided in the clamping ring 114 and have a clearance which is greater than the diameter of the head of the screw 115 in at least one section and is less than it in at least another section.

Figure 11A:
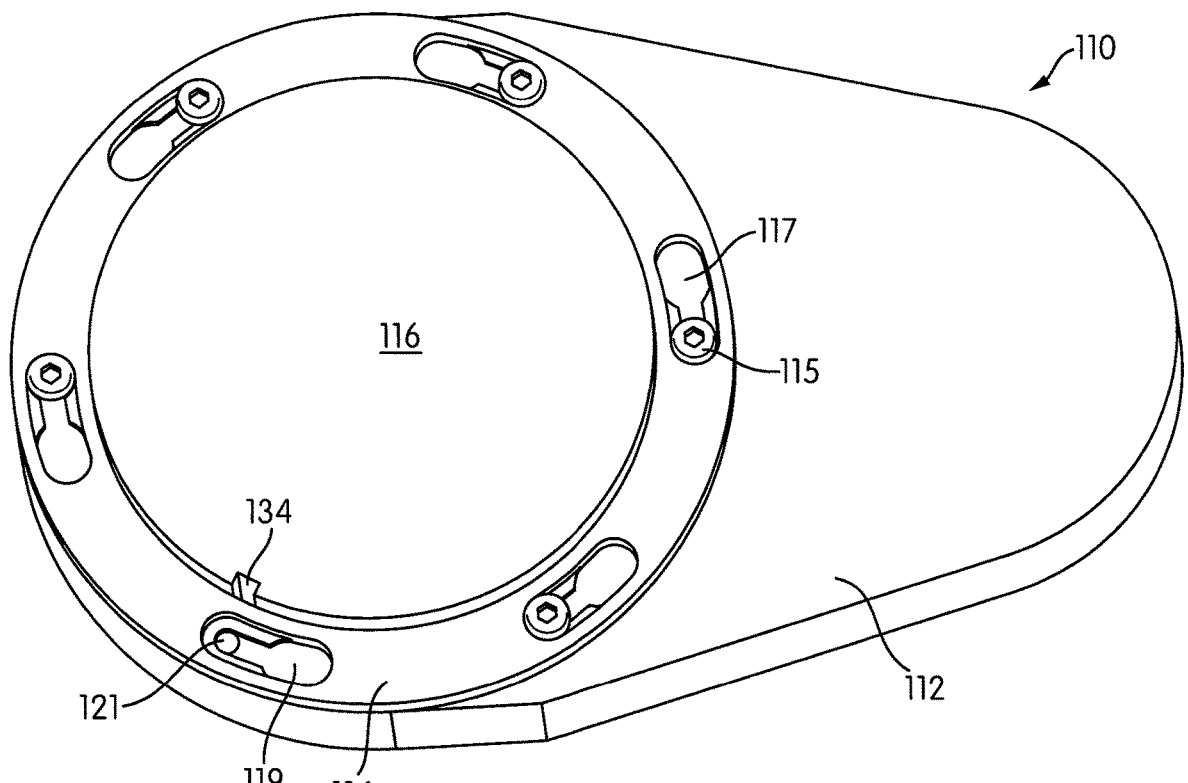
FIG. 11A is a second embodiment of a holder.
Figure 11B:
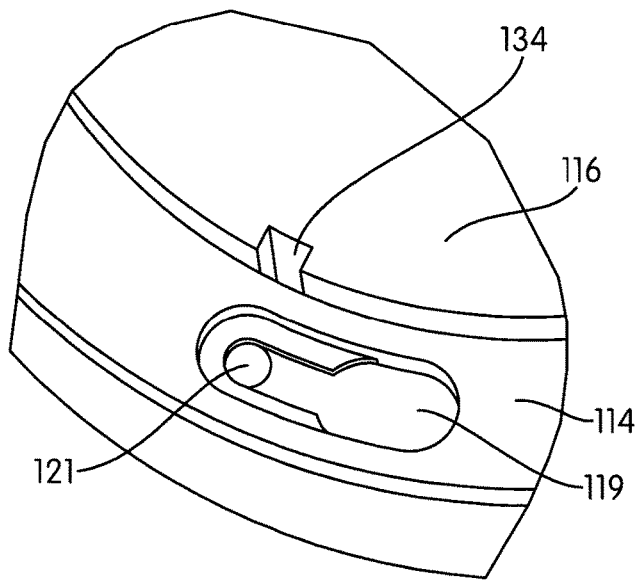
FIG. 11B is a zoomed in portion of the holder shown in FIG. 11A.

One of these oblong-shaped holes and the bore accessible therefrom are used to positively receive a section of the adapter 118. In the example of FIG. 11, an oblong-shaped hole 119 with the bore 121 is used. For this purpose, it is naturally necessary to first remove the screw required for fixing the clamping ring 114.

A base section 136 of the adapter 118 is introduced into the oblong-shaped hole 119. For this purpose, and without limiting the inventive teaching, the adapter 118 has a cuboid central part 138 with end-rounded sections 140, 142, as shown in the drawing for adaptation to the oblong-shaped hole 119. In fact, the base section 136 must be geometrically adapted to the geometry of the oblong-shaped hole 119 in such a way that movement is prevented in the radial direction of the clamping ring 114. In the longitudinal direction of the oblong-shaped hole 119 this is prevented by the fact that a pin-shaped projection 148, which is adapted to the internal geometry of the bore 121, protrudes from the base section 136. The projection 148 is adapted to the bore 121 in such a way that there is a positive engagement preventing, in principle, a relative movement. A cuboid projection 146 protrudes from the opposing flat side 150 of the base section 136, to which a mechanical referencing introduced in the blank 116 is adapted in the form of a groove 134 at least in sections so that a positive engagement of the projection 146 into the groove 134 is made possible. The result is that when the adapter 118 is inserted, this ensures a clear orientation of the blank 116 relative to the holder 110, i.e., repositioning can take place without a change in the position from that before the removal of the blank 116 from the holder 110.

The geometry of the adapter 118 is evident from the FIGS. 13A-13H, without the need for further descriptions.

In FIG. 11, the adapter 118 is not inserted so that, as a result, the blank 116 can be fixed in any desired orientation to the holder 110. This possibility no longer exists if the adapter 118 on the one hand positively engages with the projection 148 into the bore 121 which is provided with an internal thread and, on the other hand, positively engages in the groove 134 with the projection 146.

Figure 12A:
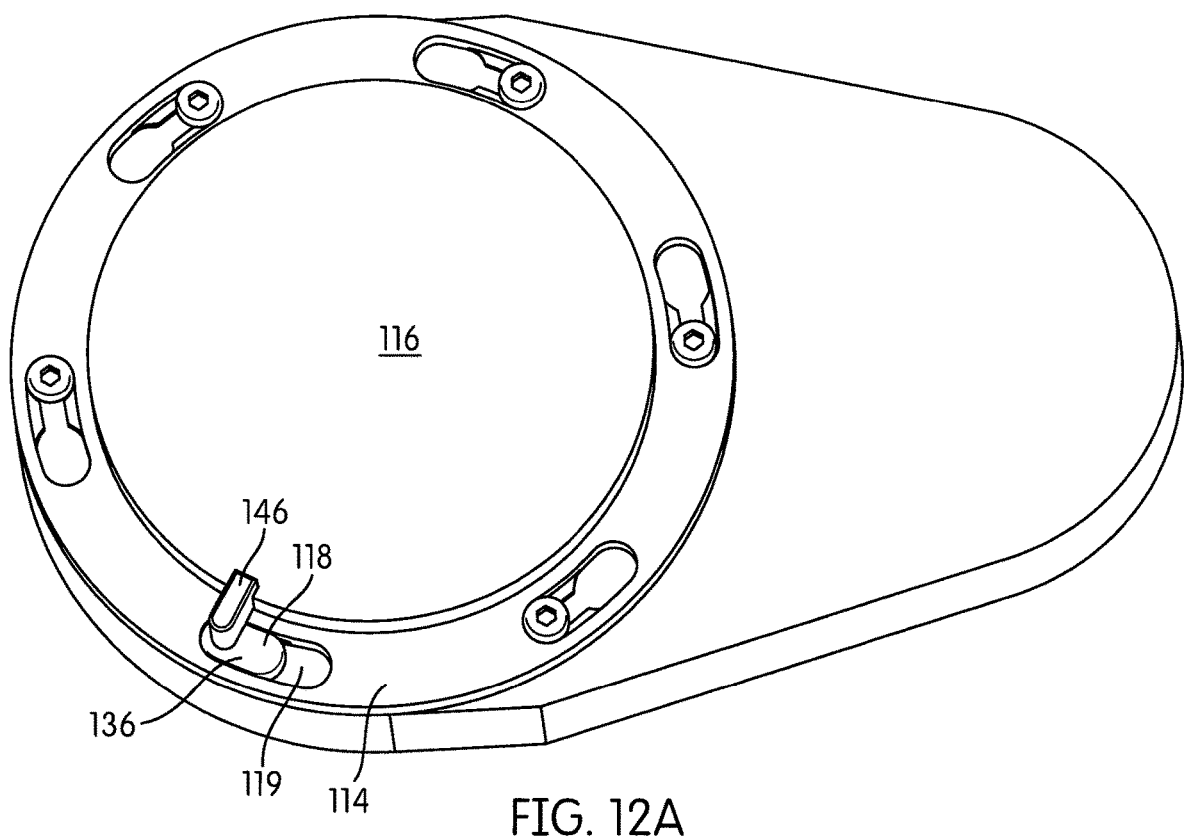
FIG. 12A is the holder according to FIG. 1 with a positioned blank.
Figure 12B:
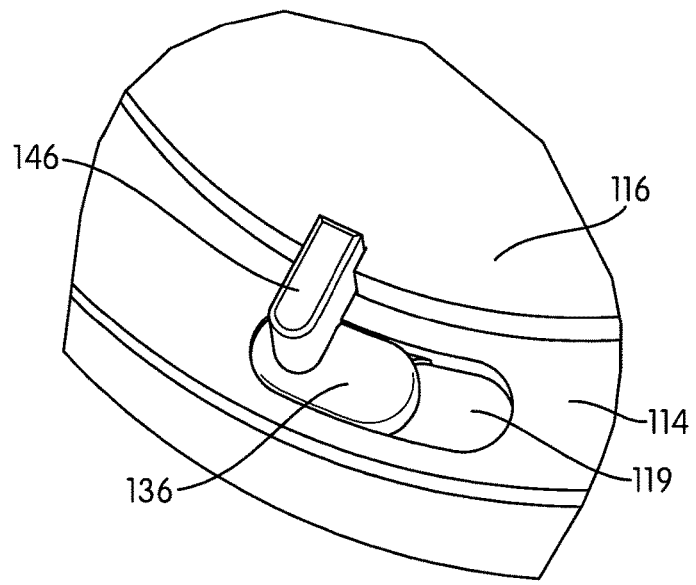
FIG. 12B is a zoomed in portion of the holder shown in FIG. 12A.
Figure 13A:
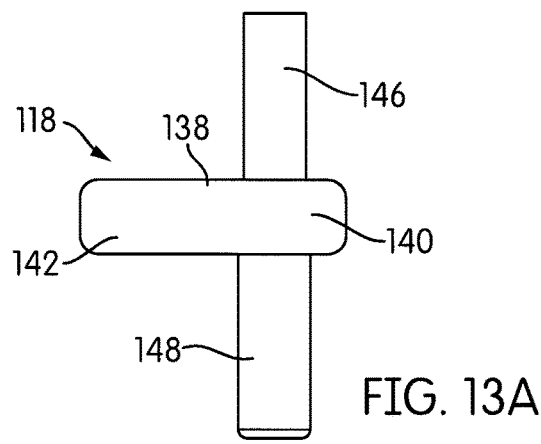
FIG. 13A is a side view of a further embodiment of an adapter.
Figure 13B:
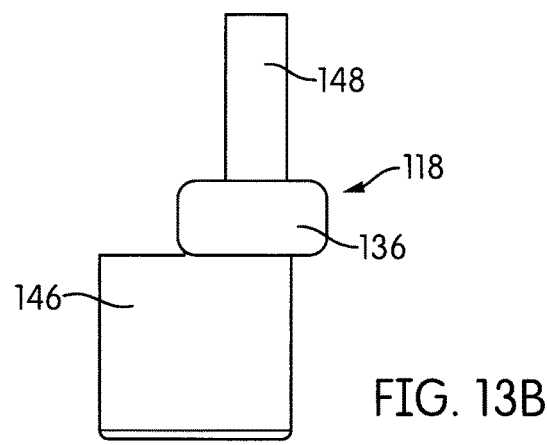
FIG. 13B is another side view of the adapter shown in FIG. 13A.
Figure 13C:
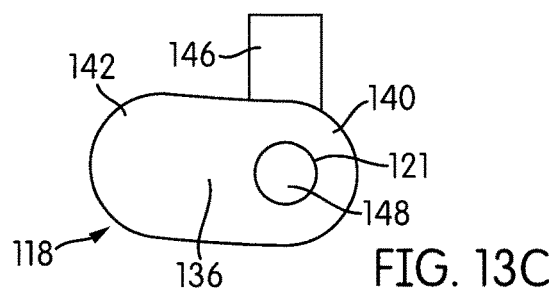
FIG. 13C is a top view of the adapter shown in FIG. 13A.
Figure 13D:
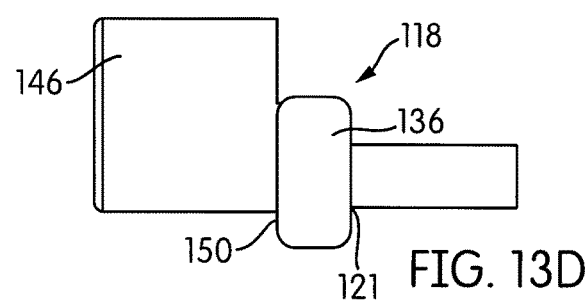
FIG. 13D is another side view of the adapter shown in FIG. 13A.
Figure 13E:
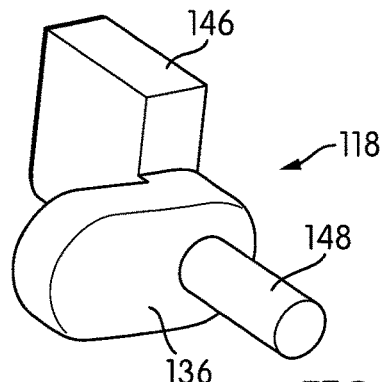
FIG. 13E is a perspective top view of the adapter shown in FIG. 13A.
Figure 13F:
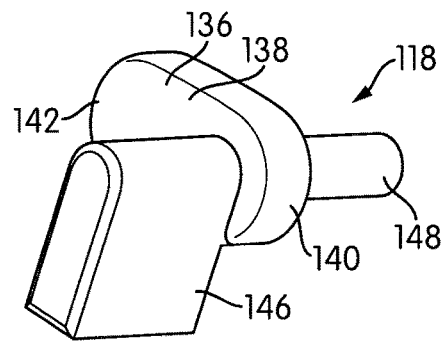
FIG. 13F is a perspective rear view of the adapter shown in FIG. 13A.
Figure 13G:
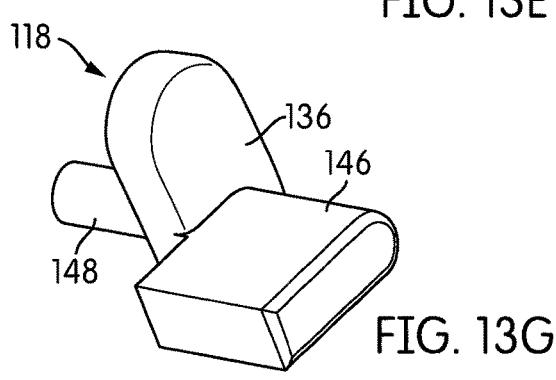
FIG. 13G is another perspective rear view of the adapter shown in FIG. 13A.
Figure 13H:
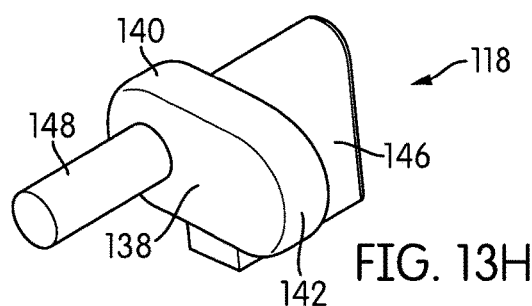
FIG. 13H is another perspective top view of the adapter shown in FIG. 13A.

It can also be seen that the projection 146, which engages positively in sections with the groove 134, bridges the clamping ring 114. This is also illustrated in FIGS. 12A-12B.

Figure 14A:
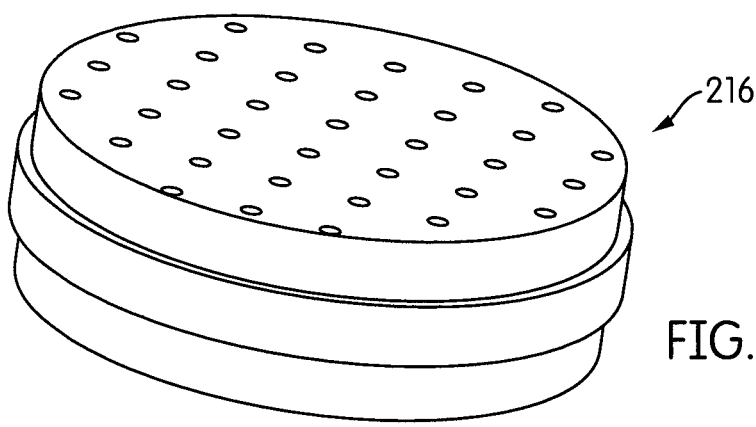
FIG. 14A is a perspective lower view of an implant blank.

In the middle view of FIG. 14, an implant blank 216 is shown which can have a geometry which is the same as that of the blank 16. In a departure from the blank 16, the implant blank has bores, some of which are identified by the reference numbers 218, 220 by way of example. The bores 218, 220 are geometrically adapted to the outer geometry of base elements of abutments. This is preferably a titanium base, on which a ceramic post is placed to form the abutment. The blank 216 is made from the corresponding material of the post, in particular zirconium dioxide.

Figure 14B:
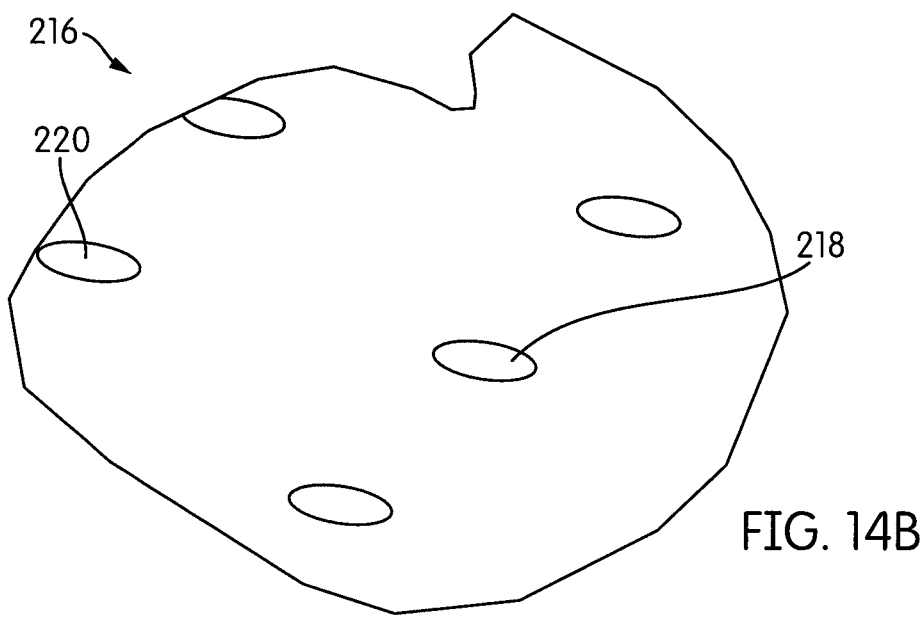
FIG. 14B is a perspective upper view of the implant blank shown in FIG. 14A.

An enlarged view of a section of the blank 216 is shown in the lower view in FIG. 14B.

Figure 14C:
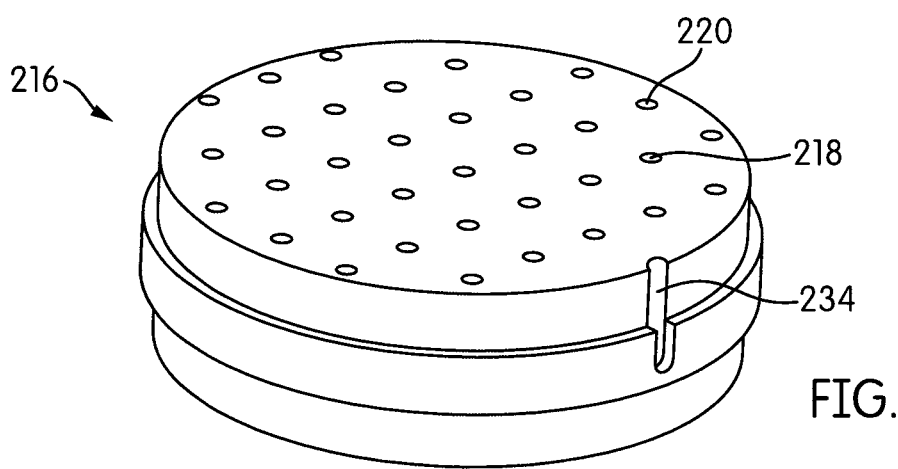
FIG. 14C is a zoomed in perspective view of the implant blank shown in FIG. 14A.

According to the teaching of the invention, the blank 216 is provided with a mechanical referencing such as groove 234, as shown in the upper view in FIG. 14C. This insures that an unambiguous repositioning is made possible in a holder in which the groove positively receives a section of an adapter, which is in turn positively connected to a holder (not shown).

The invention claimed is:

1. A method for positioning a blank comprising the steps of:
    inserting the blank in a holder so that the blank is in contact with the holder, wherein the holder has a structural element,
    positioning the blank in the holder by means of an adapter, which is inserted in both the structural element of the holder and the blank;
    wherein recess of the blank positively engages with the adapter and the adapter positively engages with the blank and
    wherein the adapter has a second section that is adapted in the circumferential direction to the structural element so that a back surface of the second section is positively inserted into the structural element without a displacement of the adapter in the direction of a circumferential wall of the holder.

2. The method according to claim 1, wherein the structural element is a recess, a depression, or a projection.

3. The method according to claim 1, further comprising the steps of:
    processing the blank after being positioning in the holder is processed;
    removing the processed blank from the holder; and
    repositioning the processed blank in the holder by means of the adapter.

4. The method according to claim 1, wherein the blank includes a mechanical referencing, which interacts with a first section of the adapter for positioning of the blank.

5. The method of claim 4, wherein the mechanical referencing is a recess or a groove.

6. The method of claim 1, further comprising the step of contacting a projection of the holder with a recess of the blank.

7. The method according to claim 4, further comprising the steps of:
    interacting the second section of the adapter with the structural element; and
    interacting the adapter having the first section with the mechanical referencing of the blank for positioning of the blank, wherein between the first section and the second section a section of the adapter bridges over a section of the holder.

8. The method according to claim 1, wherein the blank is a disc-shaped blank.

9. The method according to claim 4, wherein the first section penetrates into the mechanical referencing.

10. A method for the production of a prosthesis comprising the steps of:
    positioning of a blank in a holder;
    processing of the blank in a processing machine;
    removing of the blank from the holder;
    working of the blank outside of the processing machine;
    repositioning of the blank in the holder;
    further processing of the blank in the processing machine;
    wherein both the steps of positioning and repositioning of the blank in the holder is by means of an adapter which interacts both with the holder or a fixed-position element connected to the holder and with a mechanical referencing formed in the blank and adapted to a section of the adapter and
    wherein the adapter has a second section that is adapted in the circumferential direction to the structural element so that a back surface of the second section is positively inserted into the structural element without a displacement of the adapter in the direction of a circumferential wall of the holder.

11. The method according to claim 10, wherein the prosthesis is a full denture.

12. The method according to claim 11, wherein the blank is a disc-shaped blank.

13. The method according to claim 10, wherein the blank includes a circumferential surface, a section of an circumferential surface, an element that is connected to the blank, or an element formed integrally with the blank that is in contact with the holder, which abuts the circumferential surface, the section of the circumferential surface, the element that is connected to the blank, or the element formed integrally with the blank.

14. The method according to claim 10, wherein the blank includes an element that is connected to the blank or an element formed integrally with the blank that is circumferentially in contact with the holder, which circumferentially abuts with the element that is connected to the blank or the element formed integrally with the blank.

15. The method according to claim 13, wherein the element is a collar.

16. The method according to claim 10, wherein the blank includes a circumferential surface or a section of a circumferential surface that is circumferentially in contact with the holder, which abuts the circumferential surface or the section of a circumferential surface.

17. The method according to claim 10, further comprising the step of producing a dental prosthesis or one or more sections of an abutment from the blank.

* * * * *